United States Patent [19]
Föhl

[11] Patent Number: 4,750,686
[45] Date of Patent: Jun. 14, 1988

[54] BELT TIGHTENER ON A SAFETY BELT RETRACTOR

[75] Inventor: Artur Föhl, Schorndorf, Fed. Rep. of Germany

[73] Assignee: TRW Repa GmbH, Alfdorf, Fed. Rep. of Germany

[21] Appl. No.: 63,588

[22] Filed: Jun. 17, 1987

[30] Foreign Application Priority Data

Jun. 27, 1986 [DE] Fed. Rep. of Germany ....... 3621622

[51] Int. Cl.⁴ ............................................. B60R 22/46
[52] U.S. Cl. ............................... 242/107; 242/107.4 R; 280/806
[58] Field of Search ......... 242/107, 107.4 R, 107.4 A, 242/107.4 B; 280/806; 297/478, 480

[56] References Cited

U.S. PATENT DOCUMENTS

| | | | |
|---|---|---|---|
| 4,423,846 | 1/1984 | Fohl | 242/107 |
| 4,434,953 | 3/1984 | Gemar et al. | 242/107 |
| 4,558,832 | 12/1985 | Nilsson | 242/107 |
| 4,618,108 | 10/1986 | Butenop et al. | 242/107 |

FOREIGN PATENT DOCUMENTS

| | | |
|---|---|---|
| 1059717 | 11/1959 | Fed. Rep. of Germany . |
| 3040667 | 5/1982 | Fed. Rep. of Germany . |
| 3400177 | 7/1985 | Fed. Rep. of Germany . |
| 402731 | 10/1909 | France . |
| 200248 | 7/1923 | United Kingdom . |

Primary Examiner—John M. Jillions
Attorney, Agent, or Firm—Tarolli, Sundheim & Covell

[57] ABSTRACT

The belt tightener on a safety belt retractor comprises a pulling cable which is coupled to a drive source and which engages the periphery of a pulley. The pulley is non-rotatably connected to a gear. The gear is mounted rotatably on a swivel lever or crank which in turn is pivotally mounted on a side wall of the retractor frame. A shear pin has two portions of different cross sections and maintains the swivel crank in an initial position such that the gear is out of engagement with a pinion forming an extension of the belt reel. At the same time the shear pin holds the gear against rotation on the swivel crank. In initiation of a belt tightening operation firstly the weaker dimensioned portion of the shear pin is overcome so that the drive gear is moved into engagement with the pinion. Only thereafter is the second portion of the pin sheared off so that the gear becomes rotatable.

14 Claims, 4 Drawing Sheets

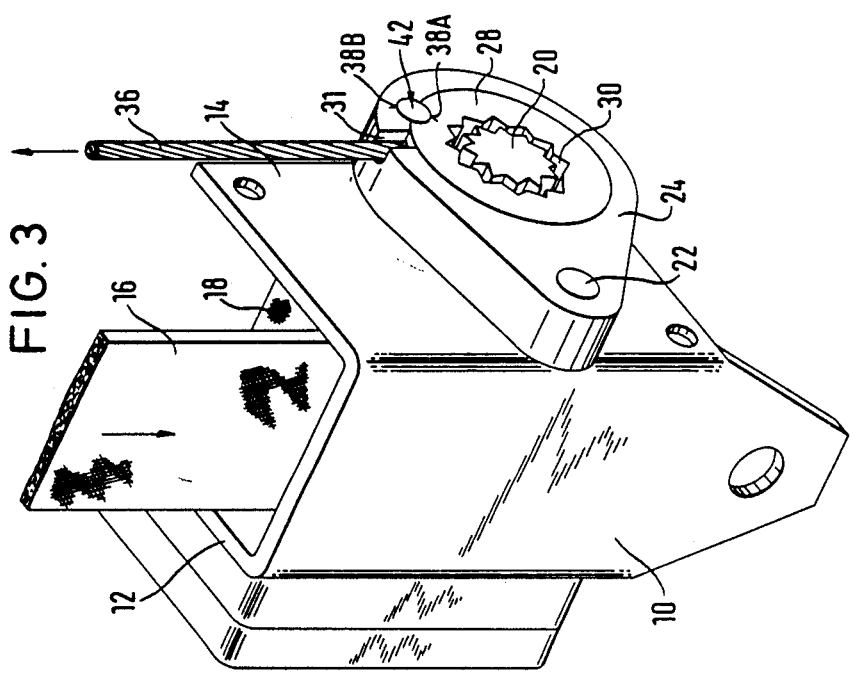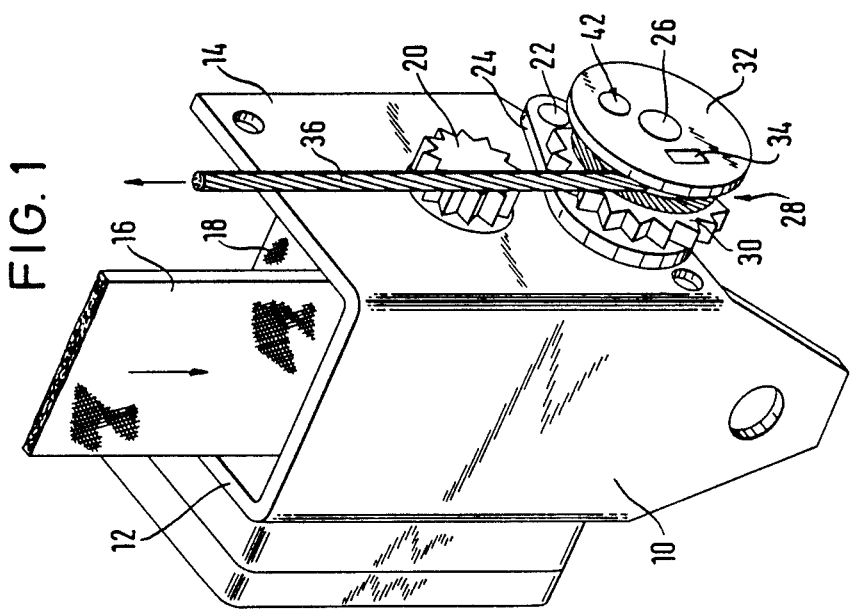

BELT TIGHTENER ON A SAFETY BELT RETRACTOR

The invention relates to a safety belt tightener in a belt retractor of a motor vehicle.

Such belt tighteners have been known for a long time. In a belt tightening operation initiated in an emergency a drive source is activated which engages via a pulling cable on a pulley. The pulley is coupled via a coupling means locked in rotation to the takeup shaft or reel of the safety belt retractor.

The present invention provides an improved belt tightener of this type.

In the belt tightener according to the invention a coupling means is provided which comprises a gear and a pinion with matching toothings, the pinion being non-rotatably connected on the driven side to the takeup shaft or the retractor and the gear is non-rotatably connected on the drive side to the pulley. Guide means are movable between a position corresponding to engagement of the pinion and gear and a disengagement position wherein the gear and pinion are radially spaced from each other. The gear is held in its initial disengagement position by holding means which can be overcome by the forces occurring in a belt tightening operation.

In this belt tightener according to the invention the coupling means is distinguished by its simplicity, small overall size and low production costs. It is particularly advantageous that the takeup shaft of the safety belt retractor both before and after the belt tightening operation is free to rotate without interference by the belt tightener drive because before the belt tightening operation the gear and pinion are held radially spaced apart and therefore completely disengaged and after completion of the belt tightening operation the drive gear can again be moved into its initial position so that the gear and pinion are again disengaged.

In an advantageous further development of the belt tightener according to the invention) the drive gear is held fixed against rotation until it has been moved into engagement with the driven pinion. This avoids that the teeth of the pinion and gear hit on each other due to relative rotation therebetween. If pinion and gear rotate relatively to each other and are simultaneously moved into engagement with each other it may happen that two toothed tips hit on each other and this would prevent correct engagement, the moving gear possibly even bouncing off. This would at least delay the belt tightening operation. The engagement operations of the coupling means must however take place within an extremely short time because the entire tightening operation can only last a few milliseconds. The danger of tooth rebound could admittedly be reduced by making the tooth tips very sharp but such a design cannot be achieved by economic mass production techniques such as molding and requires a mechanical finishing which would however be extremely cost intensive.

Several solutions are possible for ensuring that when a belt tightening operation is initiated by the tension forces becoming effective on the pulling cable and transmitted via the pulley to the drive gear firstly the gear and pinion are moved into engagement with each other and only thereafter is the rotational movement of the drive gear enabled. An advantageous embodiment resides in that the drive gear is urged by a spring engaging the guide means associated therewith into its initial position and held fixed against rotation by a shear pin or the like, the shear pin being dimensioned strong enough to ensure that initially the returning force of the spring is overcome and only thereafter the shear pin sheared off. Furthermore, the spring effects or assists the return movement of the drive toothed wheel into its initial position after completion of the tightening operation.

A particularly simple embodiment resides in that a shear pin is used having two portions with differently dimensioned cross sections and acts both as retaining means for holding the drive gear spaced from the driven pinion and as retaining means for non-rotational holding of the drive gear. The lesser dimensioned section of the shear pin is first sheared off to release the movement of the drive gear into engagement with the driven pinion; when the gear and pinion are in engagement the second section of the shear pin is sheared off to enable the rotary movement.

A particularly simple embodiment of the guide means for the drive gear includes a swivel lever or arm which is mounted pivotally on the retractor housing and carries a rotary bearing for said gear.

A particularly simple embodiment is also obtained when one end of the takeup shaft of the retractor is formed as a pinion and the drive gear likewise has an external toothing. The drive gear may however also be formed as ring gear with an internal toothing which although somewhat more involved has the advantage that the engagement surfaces between the gear and pinion are larger.

Further features and advantages of the invention will be apparent from the following description and attached drawings to which reference is made and in which:

FIG. 1 is a schematic perspective view of a first embodiment;

FIG. 3 is a perspective view of a second embodiment;

Figure 2:
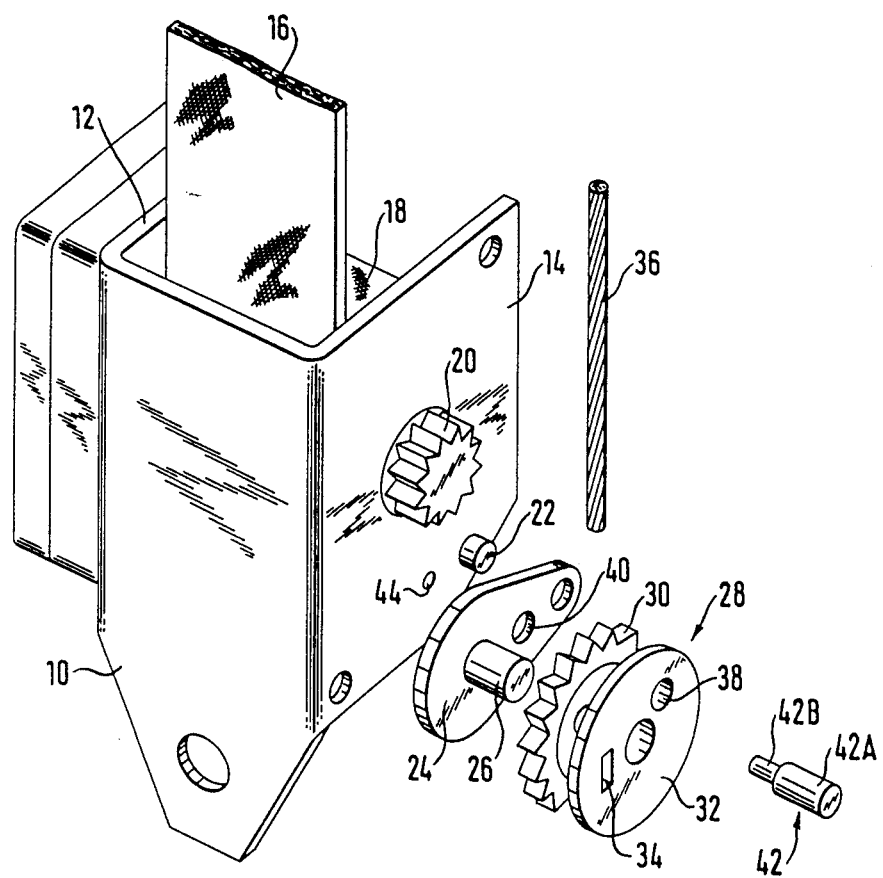
FIG. 2 is an exploded view of said embodiment.

The safety belt retractor shown in the drawing comprises a generally U-shaped housing 10 in the side walls 12, 14 of which a takeup shaft is rotatably mounted on which the belt webbing 16 is wound as coil 18. On the side of the side wall 12 there is a takeup and blocking mechanism which will not be described in detail and is usual in safety belt retractors. On the side of the side wall 14 the takeup shaft is extended and formed as a pinion 20 which has an outer toothing. Inserted into the side wall 14 is a bearing journal 22. Pivotally mounted on said bearing journal 22 is a swivel crank 24. The swivel crank 24 carries spaced from the bearing journal 22 a stud-shaped rotary bearing 26 for a component 28 which is formed by combination of an externally toothed gear 30 with a pulley 32. At the point of the pulley 32 designated by 34 the end of a pulling cable 36 is fixed, for example by caulking. As soon as a belt tightening operation is initiated a tensile force acting in the direction of the arrow acts on said pulling cable 36. As a drive source a piston/cylinder drive with pyrotechnical gas generator is expedient; however, other drive sources are also suitable, for example a hydraulic drive or the coupling of the pulling cable 36 to an inertial mass disposed in the vehicle and movable relatively to the body of the vehicle.

The component 28 comprises a bore 38 which passes axially through the pulley 32 and the toothed wheel 30 and which on suitable rotational position of said component 28 aligns with a bore 40 of the swivel crank 24. These bores 38, 40 have the same diameter. It corresponds to the outer diameter of the greater dimensioned section 42A of a shear pin 42 having two differently dimensioned sections 42A, 42B. Also aligning with the bore 40 is a bore 44 in the side wall 14. The diameter of said bore corresponds to the outer diameter of the section 42B of the shear pin 42. When the shear pin 42 is inserted into the bores 38, 40, 44 it arrests the swivel crank 24 in its initial position which is chosen such that the outer toothings of the pinion 20 and gear 30 remain spaced a small radial distance from each other so that they are disengaged. In this state the component 28 is also held non-rotatably on the swivel crank 24. Now, as soon as on initiation of a belt tightening operation a tensile force occurs in the direction indicated by an arrow at the cable 36 and acts on the periphery of the pulley 32 the weaker section 42B of the shear pin 42 is sheared off so that the swivel crank 24 is pivoted in the clockwise direction with respect to the drawing, the toothings of the pinion 20 and gear 30 thereby coming into engagement with each other. As soon as this engagement is established and the swivel crank 24 meets a stop shown in FIG. 5 and limiting the engagement position the section 42A of the shear pin 42 is greatly stressed by the continuous tensile force on the pulling cable 36 and sheared off. The component 28 with the pulley 32 and gear 30 can now rotate freely and transmit the drive force to the pinion 20 so that the takeup shaft is set in rotation and the webbing 16 tightened in the direction indicated by an arrow.

After completion of such a belt tightening operation it is ensured that the pulling cable 36 is relieved, for which purpose it suffices for example that with a piston/cylinder drive a jamming of the piston in the cylinder is avoided. The return movement of the swivel crank 24 into its initial position is thus not restricted by the tightening drive. As a result the swivel crank 24 can pivot anticlockwise in the drawing into its initial position so that the pinion 20 and gear 30 come out of engagement. The takeup shaft is now freely rotatable. The return movement of the swivel crank 24 can be effected by gravity, spring action or both.

Figure 4:
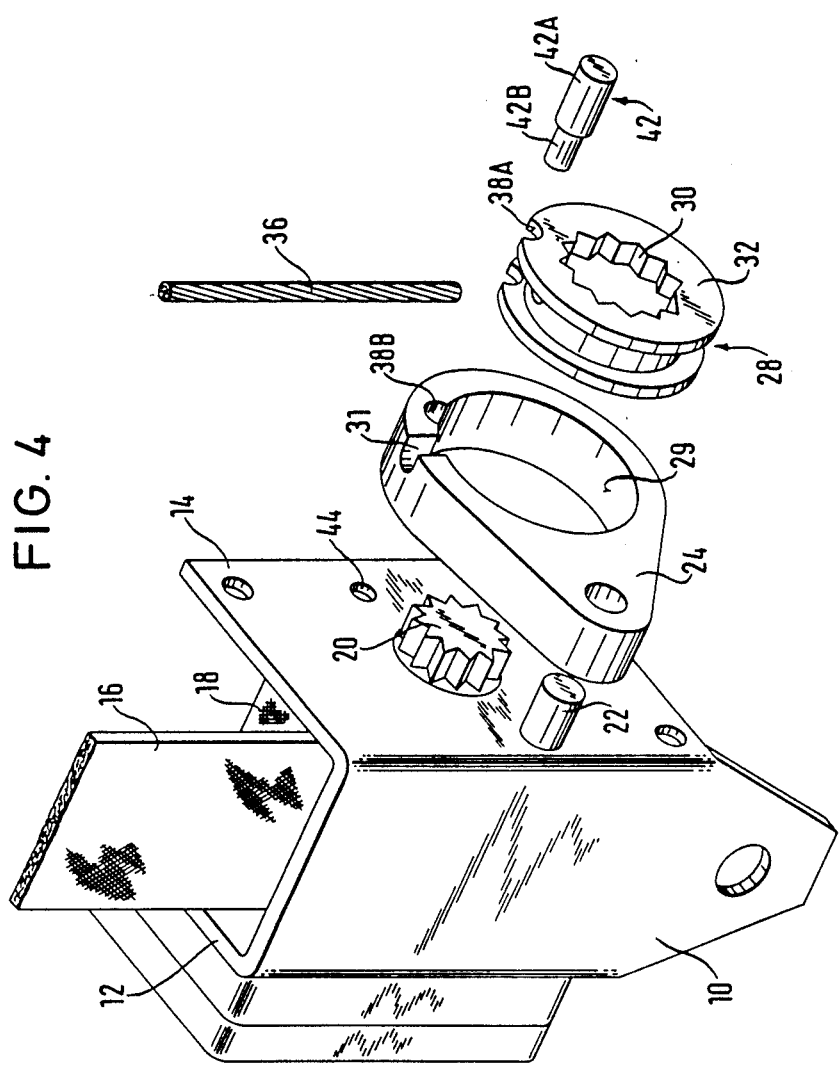
FIG. 4 is an exploded view of the second embodiment.

The embodiment according to FIGS. 3 and 4 differs from that according to FIGS. 1 and 2 in the form of the swivel crank or lever 24 and the component 28. The component 28 once again combines the pulley 32 and the gear 30 but the latter is now formed as an internally toothed ring forming the pulley 32. The annular component 28 is mounted easily rotatable in an anti-friction bearing bore 29 of the swivel crank 24. The swivel crank 24 further comprises a passage opening 31 for the pulling cable 36. As retaining means, in this embodiment as well a shear pin 42 with two sections 42A, 42B is provided. This shear pin is inserted through a bore formed by complementary cutouts 38A, 38B at the outer periphery of the component 28 and inner periphery of the anti-friction bearing bore 29 into a bore 44 in the side wall 14.

The mode of operation of this embodiment is the same as in that according to FIGS. 1 and 2 and will therefore not be described again. The embodiment according to FIGS. 3 and 4 is admittedly somewhat more complicated than the previously described embodiment but has the advantage that the teeth of the internally toothed gear 30 come into engagement over a larger surface with the outer toothing of the pinion 20 so that high drive forces can be transmitted with a small construction.

Figure 5:
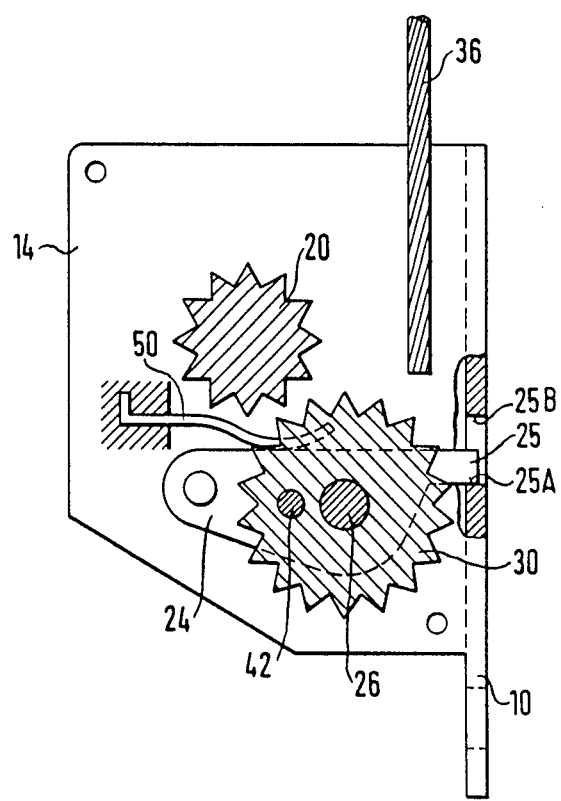
FIG. 5 is a sectional view in a plane passing through the gear and pinion of the coupling means.

In the embodiment according to FIG. 5 which represents a further development of the construction according to FIGS. 1 and 2 the swivel crank 24 is biased by a spring 50 into its initial position in which the pinion 20 and gear 30 are out of engagement with each other. This initial position is defined in that a lug 25 of the swivel crank 24 comes into engagement with a stop face 25A of the housing. The engagement position of the gear 30 is limited in that the lug 25 comes into engagement with a stop face 25B opposite the stop face 25A. This engagement position is chosen so that the toothed tips of the gear 30 are not pressed onto the bottoms of the teeth gaps of pinion 20.

The gear 30 is held non-rotatably on the swivel crank 24 by a shear pin 42 which is inserted through aligning bores of the gear 30 and the crank 24. The spring 50 and the shear pin 42 are dimensioned relatively to each other such that on initiation of a belt tightening operation the tensile forces acting in the direction of the arrow in FIG. 5 via the pulling cable 36 on the periphery of the pulley first pivot the crank 24 against the force of the spring until the lug 25 strikes the stop face 25B. Only thereafter is the shear pin 42 stressed to such an extent that it is sheared off and thus permits rotation of the gear 30. When the tightening operation is completed the pulling cable 36 is relieved and the crank 24 pivoted back by the spring 50 into its initial position, this pivot movement being supported by gravity.

As apparent from FIG. 5 the toothings of the gear 30 and pinion 20 are each formed as serrations.

In an embodiment not shown in the drawings instead of a pivotally mounted swivel crank or lever a support block is provided which is guided by a rectilinear guide disposed between it and the side wall 14 and aligned generally radially to the pinion 20.

I claim:

1. A belt tightener on a safety belt retractor for motor vehicles, the retractor having a takeup shaft whereon the belt webbing is wound and which is rotatably mounted in a retractor housing, the belt tightener comprising a pulling cable having an intermediate section engaging the periphery of a pulley to rotate the same when drive forces are applied to said pulling cable, the pulley being adapted to be drivingly connected to the takeup shaft of the retractor via a coupling means, the coupling means comprising two gear members with matching toothings, one of said gear members being nonrotatably connected to the takeup shaft and the other of said gear members being nonrotatably connected to the pulley, support means for supporting one of said gear members on said retractor housing for relative rotation and limited movement between an engagement position wherein both gear members mesh with each other and an initial position wherein said gear members are radially spaced from each other, holding means for holding one of said gear members in said initial position by a holding force which is smaller than forces acting on said holding means due to drive forces occurring in a belt tightening operation, and retaining means associated with the gear member connected to said pulley for retaining said gear member connected to said pulley fixed against rotation at least until engagement of said gear member connected to said pulley with the other gear member.

2. A belt tightener as set forth in claim 1 wherein said holding means comprises spring means for biasing the one gear member to said initial position.

3. A belt tightener as set forth in claim 1 wherein said holding means comprises a first shear pin having a first predetermined cross-section and said retaining means comprises a second shear pin having a second predetermined cross-section greater than the first predetermined cross-section of said first shear pin.

4. A belt tightener as set forth in claim 3 wherein said first and second shear pins are first and second portions of a single shear pin member.

5. A belt tightener as set forth in claim 1 wherein said support means for one of said gear members cooperates with stops which are fixed with respect to the retractor housing and define said engagement and initial positions.

6. A belt tightener as set forth in claim 1 wherein said support means for the one of said gear members comprises a swivel lever or a crank, the retractor housing comprises means for pivotally mounting said swivel lever or crank thereon, and said swivel lever or crank comprises a bearing spaced from the pivotal axis of said swivel lever or crank for supporting the one gear member.

7. A belt tightener as set forth in claim 1 wherein said one of said gear members and said pulley are integral.

8. A belt tightener as set forth in claim 1 wherein both gear members have external toothing.

9. A belt tightener as set forth in claim 1 wherein one of said gear members has external toothing and the other of said gear members is ring-shaped and has internal toothing.

10. The belt tightener according to claim 1, wherein said support means comprises a swivel lever or crank and said holding means is disposed between the retractor housing and said swivel lever or crank.

11. The belt tightener according to claim 1, wherein said support means comprises a swivel lever or crank and said retaining means is arranged between said one of said gear members and said swivel lever or crank.

12. A belt tightener as set forth in claim 4 wherein the retractor housing, the one of said gear members, and said support means for the one of said gear members have aligned openings for receiving said shear pin member.

13. A belt tightener as set forth in claim 1 wherein the toothings of both gear members are formed as serrations.

14. A belt tightener for a safety belt retractor for use in a motor vehicle, which retractor comprises a housing and a takeup shaft rotatably mounted in the housing and on which belt webbing is wound, the belt tightener comprising:

a pulley;

a pulling cable having a portion for rotating said pulley when a drive force is applied to said pulling cable; and coupling means for drivingly connecting said pulley to said takeup shaft, said coupling means comprising, first and second gear members nonrotatably connected to the takeup shaft and said pulley, respectively, means for supporting one of said first and second gear members between a first position in which said first and second gear members are radially spaced, and a second position in which said first and second gear members mesh with each other, means for holding said one of said first and second gear members in said first position, said holding means releasing said one gear member for movement to said second position when the drive force is applied to said pulling cable, and means for restraining rotation of said second gear member about its axis until after said first and second gear member mesh with each other.

* * * * *